United States Patent [19]

Bilimoria et al.

[11] Patent Number: 4,693,427

[45] Date of Patent: * Sep. 15, 1987

[54] METHOD FOR IMPROVING HANDLEABILITY OF CALCINED KAOLIN CLAY PRODUCTS

[75] Inventors: Bomi M. Bilimoria, Tennille; Herbert I. Lewis, Wrens; Jerry A. Cook, Cartersville; Ralph E. Turner Jr., Tennille; Robert H. Garner, Sandersville, all of Ga.

[73] Assignee: E.C.C. America Inc., Atlanta, Ga.

[*] Notice: The portion of the term of this patent subsequent to Dec. 31, 2002 has been disclaimed.

[21] Appl. No.: 814,644

[22] Filed: Dec. 30, 1985

Related U.S. Application Data

[63] Continuation-in-part of Ser. No. 667,400, Nov. 2, 1984, Pat. No. 4,593,860, and a continuation-in-part of Ser. No. 661,266, Oct. 15, 1984, Pat. No. 4,561,597, said Ser. No. 667,400, is a continuation of Ser. No. 341,918, Jan. 21, 1982, abandoned, said Ser. No. 661,266, is a continuation of Ser. No. 390,855, Jun. 22, 1982, abandoned.

[51] Int. Cl.$^4$ ............................................. B02C 21/00
[52] U.S. Cl. ........................................ 241/23; 241/30
[58] Field of Search ..................... 241/15, 16, 17, 23, 241/26, 29, 30, 184

[56] References Cited

U.S. PATENT DOCUMENTS

| | | | |
|---|---|---|---|
| 1,771,477 | 7/1930 | Alton | 241/29 X |
| 1,771,479 | 7/1930 | Alton | 241/29 X |
| 3,774,856 | 11/1973 | Hamilton et al. | 241/184 X |

Primary Examiner—Timothy V. Eley
Attorney, Agent, or Firm—Stefan J. Klauber

[57] ABSTRACT

A method for increasing the bulk density and decreasing the time of wetting with water of a substantially anhydrous kaolin clay powder, comprising dry milling said powder in a media mill wherein the media is at least +5 mesh, and using work inputs of from about 5 to about 40 HP-hrs/ton of dry clay. The process enables improved handling characteristics for the treated clay with respect to bulk material handling systems.

9 Claims, No Drawings

METHOD FOR IMPROVING HANDLEABILITY OF CALCINED KAOLIN CLAY PRODUCTS

RELATED APPLICATIONS

This application is a continuation-in-part of co-pending applications Ser. No. 667,400, filed Nov..2, 1984, now U.S. Pat. No. 4,593,860, and of Ser. No. 661,266, filed Oct. 15, 1984 now 4,561,597. The former is a continuation of Ser. No. 341,918, filed Jan. 21, 1982, now abandoned; and the latter is a continuation of Ser. No. 390,855, filed June 22, 1982, now abandoned.

BACKGROUND OF INVENTION

This invention relates generally to calcined clay products, and more specifically relates to a method for treating a substantially anhydrous white kaolin clay powder so as to improve the bulk handling characteristics of same when the product is loaded, unloaded and shipped.

In the course of manufacturing paper and similar products, including paper board and the like, it is well-known to incorporate quantities of inorganic materials into the fibrous web in order to improve the quality of the resulting product. A number of inorganic materials have long been known to be effective for these purposes, such as titanium dioxide, which can be incorporated into the paper in the form of anatase or rutile. Titanium dioxide, however, is among the most expensive materials which are so usable. Accordingly, in recent years, considerable efforts have been made to develop satisfactory replacements for the said titanium dioxide.

Among the materials which have thus found increasing acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. As used in this specification, the term "substantially anhydrous kaolin clay powder" shall include kaolin clays which have been heated to over 400° C. to render same anhydrous. The term thereby embraces (1) fully calcined kaolins—which usually have been heated above the 980° C. exotherm, as well as so-called (2) "metakaolin", which results from heating to lower temperatures—below the exotherm. Reference may be had in the foregoing connection to Proctor, U.S. Pat. Nos. 3,014,836 and to Fanselow et al, 3,586,823, which disclosures are representative of portions of the prior art pertinent to fully calcined kaolins; and to Morris, U.S. Pat. Nos. 3,519,453, to Podschus, 3,021,195 and 3,309,214, and to British Pat. No. 1,181,491, all of which are concerned with kaolins which are calcined to lower temperatures and which therefore can be regarded as metakaolins.

A calcined product having characteristics generally superior to previously available such pigments, is the ALPHATEX® product of Anglo-American Clays Corporation, assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high light-scattering and opacifying characteristics when incorporated as a filler in paper. The said pigment is a powdered material of quite fine size—typically at least 65% by weight are of less than 2 microns equivalent spherical diameter (ESD). The said pigment exhibits a Valley abrasion value of less than 50 mg. and usually below 30 mg., (as determined by the Institute of Paper Chemistry Procedure 65).

ALPHATEX® is further described in U.S. Pat. No. 4,381,948 to A. D. McConnell et al, as being an anhydrous white kaolin clay pigment having high light scattering when incorporated as a filler in paper, the pigment consisting of porous aggregates formed from submicron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that not more than 5% by weight thereof are greater than 10 microns ESD, at least 75% are of less than 2 microns ESD, and not more than 15% by weight are of less than 1 micron ESD. The pigment has a Valley abrasion value below 30 mg, and a GE brightness of at least 93.

Calcined kaolin clay products such as ALPHATEX® are normally pulverized in a high energy impact mill and air-classified after calcination for the purpose of removing +325 mesh residue (to conform to specification for intended use in paper), or in order to remove larger abrasive particles. Such products are then sold by the manufacturer as a finally pulverized low-bulk density powder, which powder is extremely difficult to handle by conventional bulk handling systems. Because of the difficulties in handling such products, they are typically shipped in bulk in "sparger cars". These are bulk-hopper railroad cars fitted with special valves at the bottom which allow water to be injected into the car upon arrival at the customer's facility. Air is then injected into the car to agitate the water and powdered clay mixture. As soon as possible after the injection of the water and air, the fluid suspension is pumped from the car at about 30%–35% solids into a storage tank.

Because of the low-bulk density of the clay powders, typically only 35 to 40 tons of clay can be loaded into a 4,700/ft$^3$ rail car. The bulk density of this material would be measured in the laboratory to be about 10 to 12 lbs/ft$^3$; this material would pack to about 15 to 17 lbs/ft$^3$ in a fully loaded railroad car.

A further serious problem encountered when using the bulk sparger cars is the difficulty of mixing the dry-powdered calcined kaolin clay powder with water in a car having only air agitation available as a means of mixing.

A laboratory test has been developed which measures the ease with which the dry powder can be admixed with water. This test consists of placing a known volume of water in a beaker, then pouring a known weight of calcined clay on top of the water in the beaker with no agitation of any type, and measuring the time it takes for the clay to drop below the surface of the water. The specific test hereinafter referred to in this specification as the "wet-out test" is performed as follows: 100 grams of tap water are poured into a 600 ml. beaker. 50 grams of calcined clay are then poured into the beaker while simultaneously starting a stopwatch. As soon as all of the clay has disappeared under the surface of the water without any agitation, time is noted. The result is reported in terms of time, i.e. seconds.

The wet-out test just described, can be correlated or supplemented with a further test procedure which measures a quantity designed the "work index" ("WI"). In this test, a predetermined quantity of the dry powder to be tested is deposited in a predetermined amount of water, after which the slurry is mixed at a specific set speed with a standard mechanical mixer. A parameter indicative of the resistance encountered by the mixer blades, and thus of the viscosity of the slurry is observed and plotted as a function of time. The plot is a generally bell-shaped curve which, however, flattens into a relatively level "tail" when a fully stable slurry is achieved. The point of flattening out corresponds to completion of wet-out of the powder; and the area under the curve up to that point is a measure of energy input to achieve wet-out, and is designated the "work index" for the material tested.

A "tapped" bulk density measurement procedure is used in the laboratory, and is performed as follows: A pretared 100 ml cylinder is completely filled and tapped lightly until the level in the cylinder ceases to drop fairly rapidly. The level is then adjusted to 100 ml and container and clay are weighed. The bulk density quoted in lbs/ft$^3$ is then calculated as follows:

$$\frac{\text{wt. of clay (g)} \times 7.48 \text{ gals.} \times 3785 \text{ mls.} \times 1 \text{ lb.}}{454 \text{ g} \times 100 \text{ mls. clay} \times 1 \text{ ft}^3 \times 1 \text{ gal.}} = \text{lbs/ft}^3$$

In the past, efforts have been made to increase the bulk density of the calcined powders using compaction equipment, such as bricketting machines or pelletizers. However, these have proved to be unacceptable for several reasons. Among these is that bricketting machines tend to produce hard agglomerates, which are difficult to redisperse in water. This causes problems at the paper manufacturer's slurry make-down facility.

Further, pelletizing equipment which relies upon water as a binder has been found to require the addition of large quantities of water (roughly 40% of the weight of the clay) before acceptable pellets can be formed. This water either increases the shipping costs of the product or increases production costs in that it must be evaporated prior to shipment. Pelletizing equipment relying upon binders other than water also requires large amounts of binder and are found to result in a pelletized product which is difficult to make-down in water after pelletization and drying.

It has been found that one means of improving the wet-out rate of calcined kaolin clay powders is by the addition of dispersant or surfactant in dry form to the dry powder. For example, the addition of 5 pounds dry sodium hexametaphosphate to a ton of calcined kaolin clay powder will reduce the wet-out time from about 160 seconds to about 80 seconds. This method of improving the wet-out rate is expensive, however, and does nothing to increase the bulk density of the powder.

The wet-out rate can also be improved on a laboratory scale by grinding the powder in a small lab grinder using approximately 300 HP hrs energy input per ton of clay. In this way, it has been found that the wet-out rate can be reduced substantially.

SUMMARY OF INVENTION

Now in accordance with the present invention, it has been discovered that striking improvements in both the bulk density and the wet-out characteristics of substantially anhydrous kaolin clay powders as aforementioned, can be achieved by dry milling the said kaolin clay powders using energy inputs ranging from about 5 horsepower-hours per ton of dry clay up to about 40 horsepower-hours per ton of clay, perferably from about 10 to 20 HP-hrs per ton, with about 15 HP-hr per ton being relatively optimal.

The dry milling is conducted in a media mill, such as a tumbling mill, using media having a particle size of at least $+5$ mesh. The media can comprise balls, pebbles, rods, tubes, or pill-shaped, superellipsoidal bodies and the like. Geometrically regular bodies are preferable media, and where so used it is preferred that the thickness of same as measured along the shortest axis of symmetry be at least $\frac{1}{4}$ inch. The media body can comprise various natural and/or synthetic materials, including porcelain and other ceramics, glass, steel, or other metals or alloys. The said dry milling should preferably be followed by pulverization in a high energy impact mill and air classification for the purpose of eliminating $+325$ mesh residue in order to eliminate larger abrasive particles.

Where ball-milling is used, various known mills can be employed. The said ball-milling may e.g. be carried out using apparatus such as a Patterson 6′ diameter $\times$ 3′ 6″ long continuous ball mill (center feed, peripheral discharge) in which the grinding media comprises porcelain balls of less than 5 inches diameter. Preferably, the grinding media comprises porcelain balls of from $\frac{3}{4}$″ to 2″ diameter. Other materials can also be used for the balls—such as stainless steel and the other materials that have been mentioned. The increase of bulk density of the product does not increase the difficulty of making down the product to a residue-free slurry.

It should be appreciated in connection with the present invention that a procedure such as the mentioned ball-milling, is a completely unconventional operation for use with the dry, extremely fine powdered material which is here subjected to such treatment. The material, as indicated, is to begin with largely under 2 microns ESD in particle size; and this type of material is not normally subjected to ball-milling, since such techniques are not considered to result in substantial further particle size reduction—which is the usual objective of ball-milling.

The manner in which the dry-milling enables the completely unexpected results of this invention is not well understood at present, although it appears that the operation has effects other than size reduction. It appears rather that the particle shape of the components of the powder is altered to enable the objectives above set forth. It is thought that the said milling may act upon the particles as to increase the sphericity of same—with resultant improvement in packing and wetting-out characteristics. Of particular significance is that the characteristics of the calcined kaolin clay powder which render same of such great value e.g. as a paper filler, are not impaired to any substantial degree by the method of the invention, i.e. all of the desirable characteristics went to the paper by use of such material, such as increase in opacity, high light scattering, etc., remain substantially intact.

DESCRIPTION OF PREFERRED EMBODIMENT

Practice of the present invention is illustrated by the following Examples:

EXAMPLE I

In Examples I to IX of the specification, the substantially anhydrous kaolin clay powder subjected to the process of the invention, was the unmodified ALPHATEX ® product previously described. The sample used as feed material for this Example was initially evaluated and found by the aforementioned test to have a 900 second wet-out time, and a bulk density of 9.7 lbs./ft$^3$. This product was ball-milled using a work input of approximately 15 HP hours/ton of energy, using a 13 inch diameter mill charged with 291 each of $\frac{1}{2}$, $\frac{3}{4}$, and 1 inch porcelain balls. The resultant product was found to have a bulk density of 23 lbs/ft$^3$. The product was then subjected to the wet-out test, previously described, and was found to have a 21 second wet-out time.

EXAMPLE II

Another sample of the above unmodified ALPHATEX ® calcined kaolin clay pigment and exhibiting the same wet-out and bulk density as in Example I, was ball-milled in a 28 inch diameter 29 inches long batch type ball mill using $\frac{1}{2}$ to 1 inch ceramic balls as the grinding media, also as previously described. In this instance, the energy input was 30 HP-hours/ton of dry clay. The resultant product was found to have a bulk density of 22 lbs/ft$^3$ and a wet-out time of 20 seconds.

EXAMPLE III

A sample of unmodified ALPHATEX ® calcined kaolin clay pigment having a bulk density of 11.3 lbs/ft$^3$ and a wet-out time of 400 seconds was ball-milled in the apparatus described in Example II using ceramic balls as the grinding media. The energy input was the same as in Example II. The resultant product was found to have a bulk density of 17 lbs/ft$^3$ and a wet-out time of 40 seconds.

EXAMPLE IV

A sample of unmodified ALPHATEX ® calcined kaolin clay pigment having a bulk density of 14.3 lbs/ft$^3$, a wet-out time of 3 seconds and an ESD of 94% ($\pm 2\%$) less than 2 micron size by weight, was ball-milled in a Patterson 6' diameter 3' 6" long mill using ceramic balls as the grinding media, sized from $\frac{3}{4}$" to 2 inches. In this instance, the energy input was approximately 15 HP-hrs/ton of dry clay. The resultant product was found to have a bulk density of 19 lbs/ft$^3$, a substantially improved wet-out time of 21 seconds, and a virtually unchanged ESD of 93% ($\pm 2\%$) less than 2 micron size by weight.

EXAMPLE V

A further sample of the aforementioned unmodified ALPHATEX ® calcined kaolin clay pigment having a bulk density of 10.5 lbs/ft$^3$, a wet-out time of 600 seconds, and an ESD of 96% ($\pm 2\%$) less than 2 micron size by weight, was ball-milled in a Patterson 6' diameter 3' 6" long mill using ceramic balls as the grinding media, sized from $\frac{3}{4}$" to 2 inches, and an energy input of approximately 15 HP-hrs/ton of dry clay. The resultant product was found to have a bulk density of 18 lbs/ft$^3$, a substantially improved wet-out time of 18 seconds, and again a virtually unchanged ESD of 95% ($\pm 2\%$) less than 2 micron size by weight.

In the preceding Examples, the ball-milling step is conducted upon the calcined kaolin clay powder only subsequent to pulverization in a high energy impact mill and classification—and thus represents the final step in producing the product. This procedure can in some instances produce undesirable results, as where very close control on +325 mesh residue is necessary to conform to a desired specification. In such instances the ball-milling procedure of the prior Examples can change the size classification sufficiently to cause the product to exceed the desired (very low) +325 residue. In a preferable procedure therefore, and as illustrated in the ensuing Examples, the said ball-milling is followed by pulverization in a high energy impact mill and air classification for the purpose of eliminating +325 mesh residue, and in order to eliinate larger abrasive particles. Pulverization of the powder in a high energy impact mill after dry ball-milling does not negate the desired effects of the dry ball-milling on the final product.

In all of the following Examples, the substantially anhydrous kaolin clay powder subjected to the process of the invention, was the powder which, upon pulverization and classification to eliminate undesirable larger particles as previously described, would (in the described prior art) become unmodified ALPHATEX ® product.

EXAMPLE VI

A sample of substantially anhydrous kaolin clay powder was subjected to pulverization and classification as above, to yield unmodified product, i.e. equivalent to prior art ALPHATEX ®. This material was determined to have a 156 second wet-out time and a tapped bulk density of 11.5 lbs/ft$^3$.

Another sample of the same powder was subjected to dry ball-milling followed by pulverization and classification to eliminate undesirable larger particles, and to yield a modified product in accordance with the invention. Ball-milling was accomplished using a work input of approximately 15 hp-hours/ton clay of energy, using a 13 inch diameter mill charged with 291 each of $\frac{1}{2}$, $\frac{3}{4}$, and 1 inch porcelain balls. Pulverization and classification was effected in a Hurricane ® Mill, which is a product of C. E. Bauer Co. of Chicago, Ill., the said device being a high energy impact mill with an integral classifier. The resultant material was determined to have a 62 second wet-out time and a tapped bulk density of 14.7 lbs/ft$^3$.

EXAMPLE VII

A sample of the substantially anhydrous kaolin clay powder was subjected to pulverization and classification to yield unmodified product equivalent to prior art ALPHATEX ®. This material was determined to have a wet-out time greater than 10 minutes and a tapped bulk density of 10.5 lbs/ft$^3$.

Another sample of the same powder was subjected to dry ball-milling followed by pulverization and classification in accordance with the procedure of Example VI, to yield a modified product in accordance with the invention. This resulting material was determined to have a 94 second wet-out time and a tapped bulk density of 11.8/lbs/ft$^3$.

EXAMPLE VIII

A sample of substantially anhydrous kaolin clay powder was subject to pulverization and classification to yield unmodified product equivalent to unmodified ALPHATEX ®. This material was determined to have a wet-out time greater than 10 minutes and a tapped bulk density of 10.5 lbs/ft$^3$.

Another sample of the same powder was subjected to dry ball-milling followed by pulverization and classification in accordance with the procedure of Example VI to yield a modified product in accordance with the invention. This material was determined to have a 47 second wet-out time and a tapped bulk density of 13.7 lbs/ft$^3$.

EXAMPLE IX

A sample of substantially anhydrous kaolin clay powder was subjected to pulverization and classification to yield unmodified product equivalent to prior art AL-PHATEX ®. This material was determined to have an 82 second wet-out time and tapped bulk density of 12.5 lbs/ft$^3$.

Another sample of the same powder was subjected to dry ball-milling followed by pulverization and classification as in Example VI, to yield a modified product in accordance with the invention. This material was determined to have a 53 second wet-out time and a tapped bulk density of 13.9 lbs/ft$^3$.

EXAMPLE X

In this Example, a series of 22 further test samples of calcined kaolin powder generally produced in accordance with the procedure set forth in the aforementioned U.S. Pat. No. 4,381,948 were utilized as the input to the process of the invention. More specifically, the samples were the output product from the calciner in the said patent, which product was then subjected to dry milling and/or to pulverization as indicated. Thus, in the instance of samples 1 through 3 no pulverization step was utilized either subsequent or prior to the dry milling step of the invention. In the case of each sample, the work input provided during the milling process was in the range of the invention, i.e. of 5 to 40 HP-hrs/ton of dry solids—the same milling time was used for each sample. A tumbling mill was utilized with different types of media, both with respect to the material of the media and with respect to the size of the media bodies. Wet-out time and work index were measured for each sample. The wet-out times measured in seconds, the associated work index, brightness of the resulting product, and bulk densities are set forth in Table I below. It is seen from samples 1 to 3 that where the method of the invention is utilized, even without any pulverization being employed, the wet-out time is sharply reduced in comparison to samples processed without the dry milling step of the invention. Samples 4 and 5 illustrate that in the absence of the milling step of the invention, even with pulverization, wet-out time is very high. As seen e.g. in Sample 6, wet-out is sharply reduced by practice of the invention.

Ceramic balls of various sizes are used in Samples 3 through 10. In Samples 11 through 14 steel balls of various sizes are found to be less effective, but nonetheless very useful in the invention. In Samples 15 through 19, ceramic rods of various dimensions are used, and are found to be efficaceous in the invention, as are the ceramic flats utilized in Samples 23, 22. Equally apparent is the increase in bulk density achieved by practice of the invention in all of the samples wherein the dry milling step is utilized.

TABLE I

| Sample | Processing | Media | Media Size (") | Wet Out Time (sec) | Work Index | G.E. Brightness | Bulk Density (lbs/ft$^3$) |
|---|---|---|---|---|---|---|---|
| 1 | No ball milling, no pulverization, no TSPP | — | — | +300 | 271 | 91.7 | 9.8 |
| 2 | No ball mill, no pulverization, 3 lbs/T TSPP* | — | — | +300 | 207 | 91.6 | 9.9 |
| 3 | Ball-milled, no pulverization 3 lbs/T TSPP | Ceramic balls | ⅛-½"<br>⅜-¾"<br>½-1" | 13 | 27 | 91.4 | 22.1 |
| 4 | No ball-mill, pulverized no TSPP | — | — | +300 | 293 | 91.4 | 14.3 |
| 5 | No ball-mill, pulverized 3 lbs/T TSPP | — | — | +300 | 180 | 91.7 | 13.4 |
| 6 | Ball-milled, pulverized no TSPP | Ceramic balls | ⅛-½"<br>⅜-¾"<br>½-1" | 55 | 24.9 | 91.6 | 17.7 |
| 7 | Ball-milled, pulverized 3 lbs/T TSPP | Ceramic balls | ⅛-½"<br>⅜-¾"<br>½-1" | 57 | 17.8 | 91.5 | 16.7 |
| 8 | Ball-milled, pulverized 3 lbs/T TSPP | Ceramic balls | ½" | 54 | 7.2 | 91.4 | 16.8 |
| 9 | Ball-milled, pulverized 3 lbs/T TSPP | Ceramic balls | ¾" | 75 | 4.6 | 91.5 | 15.9 |
| 10 | Ball-milled, pulverized 3 lbs/T TSPP | Ceramic balls | 1" | 83 | 8.3 | 91.4 | 16.4 |
| 11 | Ball-milled, pulverized 3 lbs/T TSPP | Steel balls | ½" | 78 | 16.6 | 91.5 | 14.6 |
| 12 | Ball-milled, pulverized 3 lbs/T TSPP | Steel balls | ¾" | 60 | 24.2 | 91.5 | 15.6 |
| 13 | Ball-milled, pulverized 3 lbs/T TSPP | Steel balls | 1" | 80 | 31.2 | 91.5 | 16.3 |
| 14 | Ball-milled, pulverized 3 lbs/T TSPP | Steel balls | ⅛-½"<br>⅜-¾"<br>½-1" | 81 | 28.3 | 91.5 | 16.0 |

TABLE I-continued

| Sample | Processing | Media | Media Size (") | Wet Out Time (sec) | Work Index | G.E. Brightness | Bulk Density (lbs/ft³) |
|---|---|---|---|---|---|---|---|
| 15 | Ball-milled, pulverized 3 lbs/T TSPP | Ceramic Rods | ¼ × ¼ | 77 | 33.2 | 91.4 | 15.8 |
| 16 | Ball-milled, pulverized 3 lbs/T TSPP | Ceramic Rods | ½ × ½ | 55 | 36.1 | 91.5 | 16.9 |
| 17 | Ball-milled, pulverized 3 lbs/T TSPP | Ceramic Rods | 13/16 × 13/16 | 69 | 36.6 | 91.4 | 16.9 |
| 18 | Ball-milled, pulverized 3 lbs/T TSPP | Ceramic Rods | 1¼ × 1¼ | 74 | 33.7 | 91.3 | 17.2 |
| 19 | Ball-milled, pulverized 3 lbs/T TSPP | Ceramic Rods 13/16 | ¼–½ × ¼ ½–13/16 × ½–1¼ × 1¼ | 52 | 49.4 | 91.5 | 15.2 |
| 20 | Ball-milled, pulverized 3 lbs/T TSPP | Ceramic Flats | D 1¼ × ¾ oval | 69 | 32.2 | 91.3 | 16.2 |
| 21 | Ball-milled, pulverized 3 lbs/T TSPP | Ceramic Flats | ½ × 5/16 oval | 121 | 15.5 | 91.4 | 16.4 |
| 22 | Ball-milled, pulverized 3 lbs/T TSPP | Ceramic Flats | ½ A ½ D | 46 | 74.4 | 91.5 | 17.1 |

*Tetra sodium pyrophosphate

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. A method of preparing a calcined kaolin clay powder having increased bulk density and decreased wet-out time comprising:
    (a) heating a kaolin clay powder of fine particle size to at least 400° C. to render same at least substantially anhydrous; and
    (b) dry milling said anhydrous clay powder in a media mill using media having a particle size of at least +5 mesh, and using a work input in the range of from about 5 to about 40 HP-hrs/ton of dry clay.

2. A method in accordance with claim 1, wherein said media comprises geometrically regular bodies.

3. A method in accordance with claim 2, wherein the thickness of said bodies as measured along the shortest axis of symmetry is at least ½ inch.

4. A method in accordance with claim 3, wherein said bodies are selected from one or more members of the group consisting of balls, rods, tubes, pill-shaped, and superellipsoidal bodies.

5. A method in accordance with claim 3, wherein said bodies comprise a ceramic.

6. A method in accordance with claim 3, wherein said bodies comprise a steel.

7. A method in accordance with any of claims 1, 2, 3, or 4, wherein the work input is the range of from about 10 to 20 HP-hrs/ton of dry clay.

8. A method in accordance with any of claims 1, 2, 3 or 4, wherein said anhydrous kaolin clay powder subjected to step (b) has been pulverized and classified to remove undesirable larger particles.

9. A method in accordance with any of claims 1, 2, 3 or 4, wherein the product from step (b) is pulverized and classified to eliminate undesirable larger particles.

* * * * *